US012651535B2

(12) United States Patent
Forrest et al.

(10) Patent No.: US 12,651,535 B2
(45) Date of Patent: Jun. 9, 2026

(54) EFFICIENT MODEL SELECTION FOR PROCESSING RESPONSES TO PROMPTS IN CONTEXT OF EDUCATIONAL APPLICATION

(71) Applicant: Coursemojo, Inc., Washington, DC (US)

(72) Inventors: James Allen Forrest, Pittsburgh, PA (US); Eric Douglas Westendorf, Washington, DC (US); Elizabeth Noel Onder, New York, NY (US); Rostislav Roznoshchik, Brooklyn, NY (US); Russell John Ballestrini, Waterford, CT (US); Gavin William Deiss, Brooklyn, NY (US); Daniel Belvin Barton, Williamsburg, VA (US)

(73) Assignee: Coursemojo, Inc., Washington, DC (US)

( * ) Notice: Subject to any disclaimer, the term of this patent is extended or adjusted under 35 U.S.C. 154(b) by 0 days.

(21) Appl. No.: 18/487,713

(22) Filed: Oct. 16, 2023

(65) Prior Publication Data

US 2025/0124804 A1     Apr. 17, 2025

(51) Int. Cl.
*G09B 7/04*          (2006.01)
*G09B 7/08*          (2006.01)

(52) U.S. Cl.
CPC ................. *G09B 7/04* (2013.01); *G09B 7/08* (2013.01)

(58) Field of Classification Search
CPC .................................... G09B 7/04; G09B 7/08
See application file for complete search history.

(56)                References Cited

U.S. PATENT DOCUMENTS

| | | | | |
|---|---|---|---|---|
| 6,427,063 | B1 * | 7/2002 | Cook ....................... | G09B 7/00 |
| | | | | 434/350 |
| 10,276,055 | B2 * | 4/2019 | Gustafson ................ | G09B 7/02 |
| 10,354,544 | B1 * | 7/2019 | Chernin ................... | G09B 7/06 |
| 10,861,344 | B2 * | 12/2020 | Smith Lewis ......... | G09B 5/125 |
| 11,037,459 | B2 * | 6/2021 | D'Helon ................. | G09B 7/04 |
| 11,417,235 | B2 * | 8/2022 | Zhang .................... | G09B 5/125 |
| 11,545,042 | B2 * | 1/2023 | Harlow ................. | G06T 11/203 |
| 11,769,492 | B2 * | 9/2023 | Kim ........................ | G10L 25/51 |
| | | | | 704/232 |
| 11,922,827 | B2 * | 3/2024 | Chadwick ................ | G09B 7/08 |
| 12,020,593 | B2 * | 6/2024 | Rushkin ................ | G06Q 50/20 |
| 12,027,069 | B2 * | 7/2024 | Reilly ...................... | G09B 7/00 |
| 12,254,785 | B2 * | 3/2025 | Lee ......................... | G06V 30/12 |
| 12,307,919 | B1 * | 5/2025 | Chilton .................... | G09B 7/04 |

(Continued)

*Primary Examiner* — Xuan M Thai
*Assistant Examiner* — Sadaruz Zaman
(74) *Attorney, Agent, or Firm* — Fenwick & West LLP

(57)          ABSTRACT

An educational application displays a prompt to a student user and receives, from the student user, a response to the prompt. The educational application determines a predicted set of requirements for processing the prompt, and selects, from a plurality of candidate models having different processing capabilities, a model for processing the response based on the predicted set of requirements. The educational application applies, as input to the selected model, the response, where the selected model is provided instructions for determining an evaluation for the response. The educational application selects a next prompt to be displayed to the student user by the user interface based on the determined evaluation and displays the next prompt.

20 Claims, 7 Drawing Sheets

(56)     References Cited

U.S. PATENT DOCUMENTS

| | | | |
|---|---|---|---|
| 2015/0106705 A1* | 4/2015 | Vuong ................. | G06F 40/166 |
| | | | 715/271 |
| 2019/0272775 A1* | 9/2019 | Noble ...................... | G09B 5/12 |
| 2022/0253963 A1* | 8/2022 | Fowler ................. | G06Q 50/205 |
| 2024/0370769 A1* | 11/2024 | Sheth ..................... | G06N 20/00 |
| 2025/0095507 A1* | 3/2025 | Stegall ................. | G06F 16/285 |
| 2025/0124804 A1* | 4/2025 | Forrest .................... | G09B 7/08 |
| 2025/0139445 A1* | 5/2025 | Gao ........................ | G06F 40/40 |
| 2025/0173630 A1* | 5/2025 | Nishimoto ............. | G06N 20/00 |
| 2025/0181844 A1* | 6/2025 | Rosset ................... | G06F 40/30 |

* cited by examiner

100

<u>300</u>

```
1   spec_version: "coursemojo:content_question_feedback:3" # Identifies the version of this
    spec. The first segment is the vendor name, the second segment is the spec name, and
    the third segment is a monotonically increasing
2   activity_version: 1 # Identifies the version of this activity. Whenever any values in
    the spec below are changed, this number should be increased by 1. (Required)
3   title: My Activity Title # A title for the activity. May be displayed to the user.
    (Required)
4   default_max_attempts_per_step: 3   # The default for the number of attempts a student is
    allowed to use for each step below before moving on to the next step. (Required)
5   sections: # A list of sections in the activity (Required)
6     - title: My Section Name  # A title for the section. May be displayed to the user.
      (Required)
7     label: my-section-label  # A unique label for the section. (Required if you need
      to jump to this section. Sections cannot be labeled 'next' or 'null'. Each label
      for sections & steps must be unique.)
8     background_for_ai: > # A prompt given to the AI language model at the start of
      this section. (Required)
9     You are an expert tutor. Etc.-
10    steps:  # A list of steps in this section of the activity (Required)
11    - label: my-step-label # A unique label for this step (Required if you need to
      jump to this step. Steps cannot be labeled 'next' or 'null'. Each label for
      sections & steps must be unique.)-
12    - label: closing-content-blocks-
```

Figure 4:
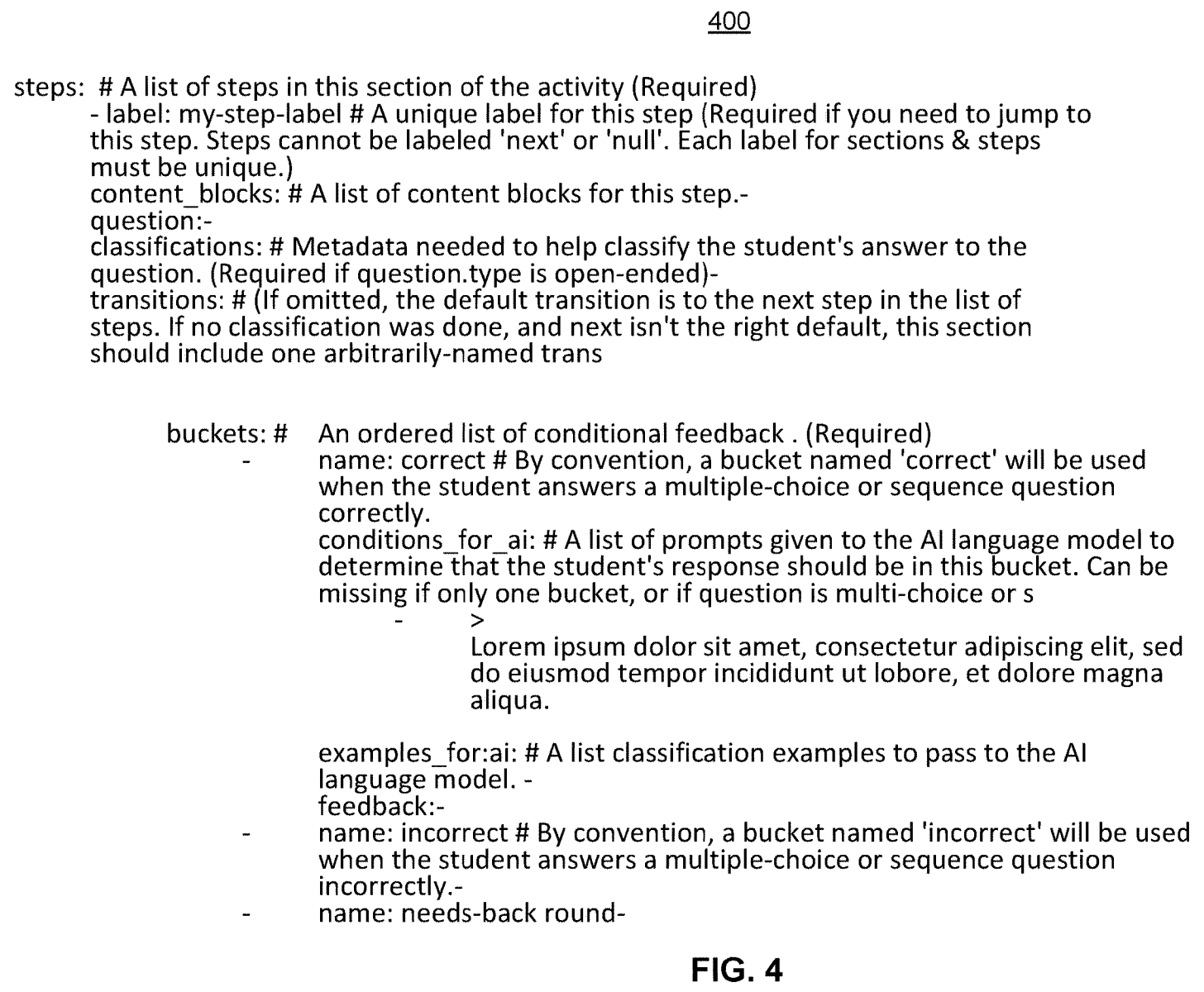

```
steps:  # A list of steps in this section of the activity (Required)
      - label: my-step-label # A unique label for this step (Required if you need to jump to
        this step. Steps cannot be labeled 'next' or 'null'. Each label for sections & steps
        must be unique.)
        content_blocks: # A list of content blocks for this step.-
        question:-
        classifications: # Metadata needed to help classify the student's answer to the
        question. (Required if question.type is open-ended)-
        transitions: # (If omitted, the default transition is to the next step in the list of
        steps. If no classification was done, and next isn't the right default, this section
        should include one arbitrarily-named trans buckets: #  An ordered list of conditional feedback . (Required)
               -  name: correct # By convention, a bucket named 'correct' will be used
                  when the student answers a multiple-choice or sequence question
                  correctly.
                  conditions_for_ai: # A list of prompts given to the AI language model to
                  determine that the student's response should be in this bucket. Can be
                  missing if only one bucket, or if question is multi-choice or s
                  >
                        Lorem ipsum dolor sit amet, consectetur adipiscing elit, sed
                        do eiusmod tempor incididunt ut lobore, et dolore magna
                        aliqua.
                  - examples_for:ai: # A list classification examples to pass to the AI
                  language model. -
                  feedback:-
               -  name: incorrect # By convention, a bucket named 'incorrect' will be used
                  when the student answers a multiple-choice or sequence question
                  incorrectly.-
               -  name: needs-back round-
```

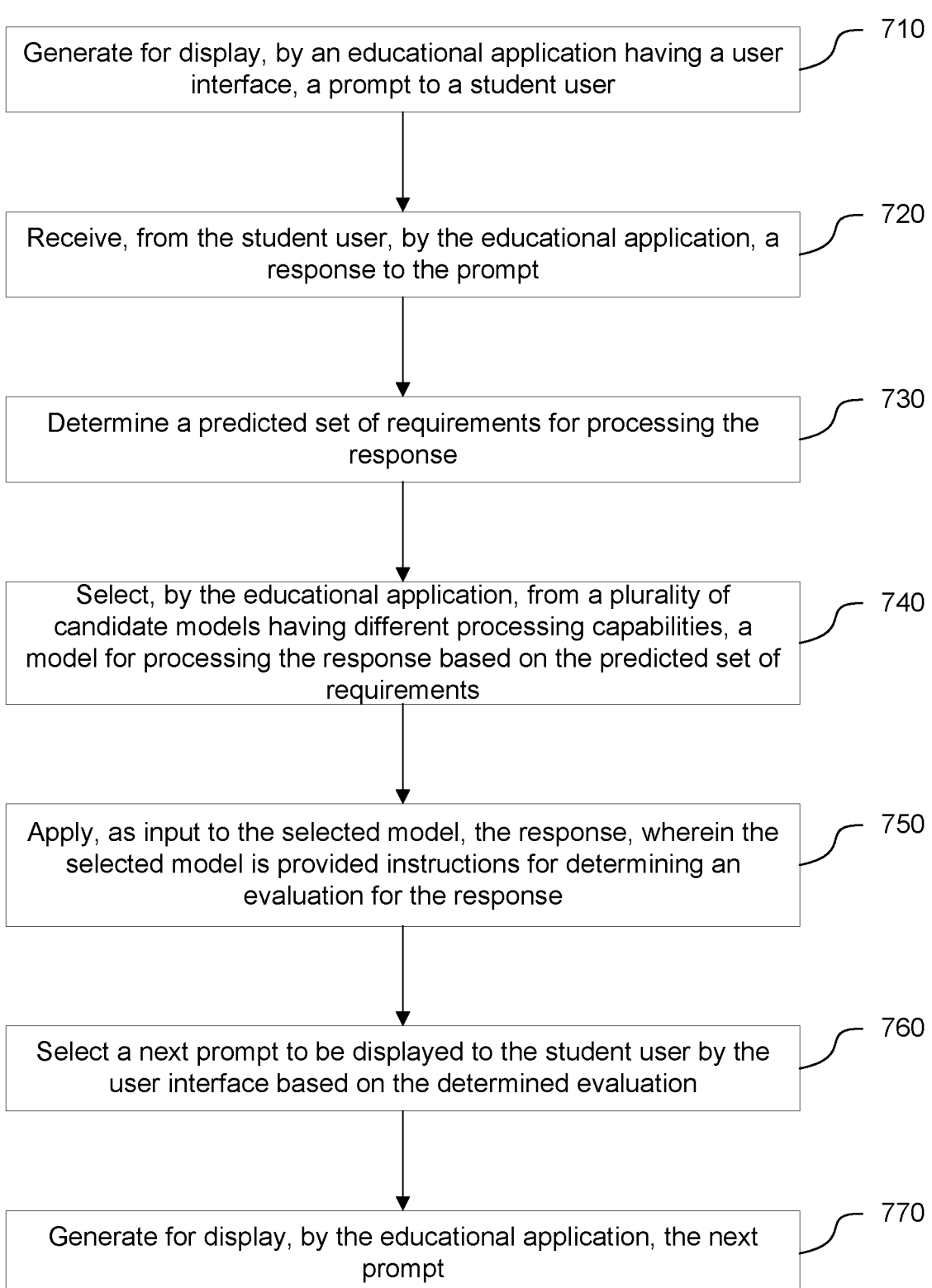

Generate for display, by an educational application having a user interface, a prompt to a student user — 710

Receive, from the student user, by the educational application, a response to the prompt — 720

Determine a predicted set of requirements for processing the response — 730

Select, by the educational application, from a plurality of candidate models having different processing capabilities, a model for processing the response based on the predicted set of requirements — 740

Apply, as input to the selected model, the response, wherein the selected model is provided instructions for determining an evaluation for the response — 750

Select a next prompt to be displayed to the student user by the user interface based on the determined evaluation — 760

Generate for display, by the educational application, the next prompt — 770

FIG. 7

EFFICIENT MODEL SELECTION FOR PROCESSING RESPONSES TO PROMPTS IN CONTEXT OF EDUCATIONAL APPLICATION

TECHNICAL FIELD

This disclosure generally relates to the field of machine learning, and more particularly relates to efficient usage of large language models in an educational application.

BACKGROUND

While the use of generative machine learning has proliferated, with large language models being used to process queries across a variety of domains, such use of generative machine learning in educational applications is inefficient and not scalable given the large amount of time and compute resources required to process sophisticated and iterative queries. For example, in an educational application where every answer from myriad students is to be interpreted using a large language model, allocating the amount of compute resources required to process each answer on an ongoing basis may be impractical or impossible to achieve.

SUMMARY

Systems and methods are disclosed herein for deploying an educational application that selectively uses large language models depending on preprocessing outcomes to efficiently determine whether to use large language models or other models to process input by a student, and to determine which large language model to use where one is to be used. In this manner, resources are efficiently tailored to the processing needs of student inputs, rather than always used by default.

In some embodiments, an educational application generates for display a prompt to a student user. The education application receives, from the student user, a response to the prompt. The educational application determines a predicted set of requirements for processing the response, and selects, from a plurality of candidate models having different processing capabilities, a model for processing the response based on the predicted set of requirements. The educational application applies, as input to the selected model, the response, where the selected model is provided instructions for determining an evaluation for the response. The educational model selects a next prompt to be displayed to the student user by the user interface based on the determined evaluation, and generates for display the next prompt.

BRIEF DESCRIPTION OF THE DRAWINGS

FIG. 3 shows one embodiment of an exemplary code file for prompting a student user, in accordance with an embodiment.

FIG. 4 shows one embodiment of an exemplary code file for processing answers received from a student user, in accordance with an embodiment.

FIG. 7 illustrates an exemplary flowchart showing a process for implementing an educational application, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
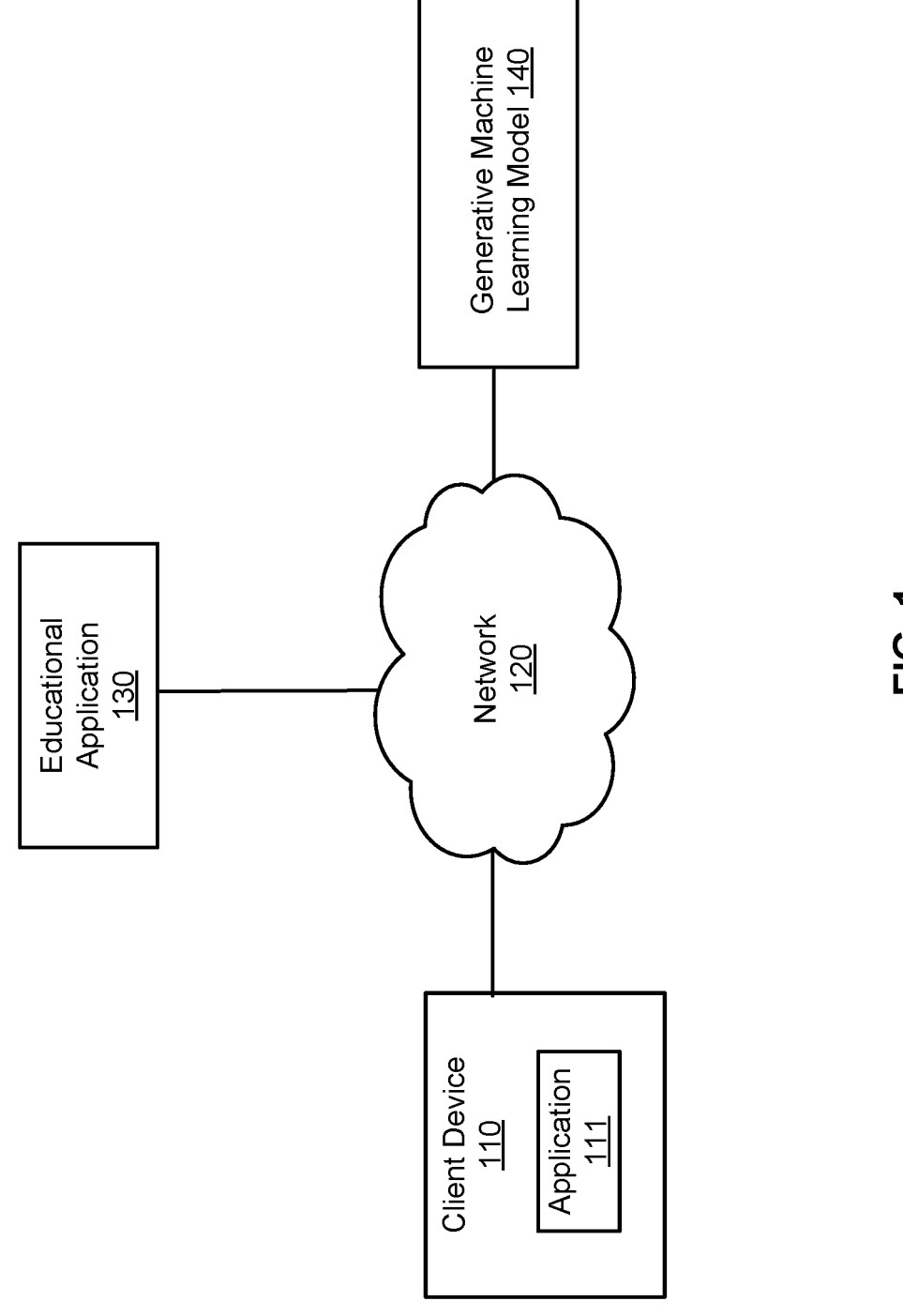
FIG. 1 illustrates one embodiment of a system environment for implementing an educational application, in accordance with an embodiment.

FIG. 1 illustrates one embodiment of a system environment for implementing an educational application, in accordance with an embodiment. As depicted in FIG. 1, environment 100 includes client device 110 (with application 111 installed thereon), network 120, educational application 130, and models 140. While only one instance of each item is depicted, this is for illustrative convenience, and references in the singular to each item is meant to cover instances where plural items exist.

Client device 110 is a device with which a user (e.g., a student, an educator) may interface with educational application 130. Client device 110 may be any device having a user interface and capable of communication with malware detection tool 130. For example, client device 110 may be a personal computer, laptop, tablet, wearable device, kiosk, smart phone, or any other device having components capable of performing the functionality disclosed herein.

Optionally, client device 110 may have application 111 installed thereon. Application 111 may provide an interface between client device 110 and educational application 130. Application 111 may be a stand-alone application installed on client device 110 that is communicatively coupled with educational application 130 to perform at least some of the activity described with respect to educational application 130 on client device 110, or may be accessed by way of a secondary application, such as a browser application. Any activity described herein with respect to educational application 130 may be performed wholly or in part (e.g., by distributed processing) by application 111. That is, while activity is primarily described as performed in the cloud by educational application 130, this is merely for convenience, and all of the same activity may be performed wholly or partially locally to client device 130 by application 111. Exemplary activity of application 111 may include providing a user interface to a student user that outputs prompts to the student user, receives responses, and transmits those responses for further processing by educational application 130.

Network 120 facilitates transmission of data between client device 110, educational application 130, and models 140, as well as any other entity with which any entity of environment 100 communicates. Network 120 may be any data conduit, including the Internet, short-range communications, a local area network, wireless communication, cell tower-based communications, or any other communications.

Educational application 130 receives inputs from one or more users of client device 110 and processes those inputs (e.g., using models 140) to provide educational content.

Models 140 may be used by educational application 130 to process and generate educational content. While depicted apart from educational application 130 as a third-party service, one or more of the models of models 140 may be integrated with educational application 130 as a first-party service. Educational application 130 may have its functionality distributed across any number of servers, and may have some or all functionality performed local to client devices using application 111. Further details about educational application 130 and models 140 are disclosed below with respect to FIGS. 2-7.

Figure 2:
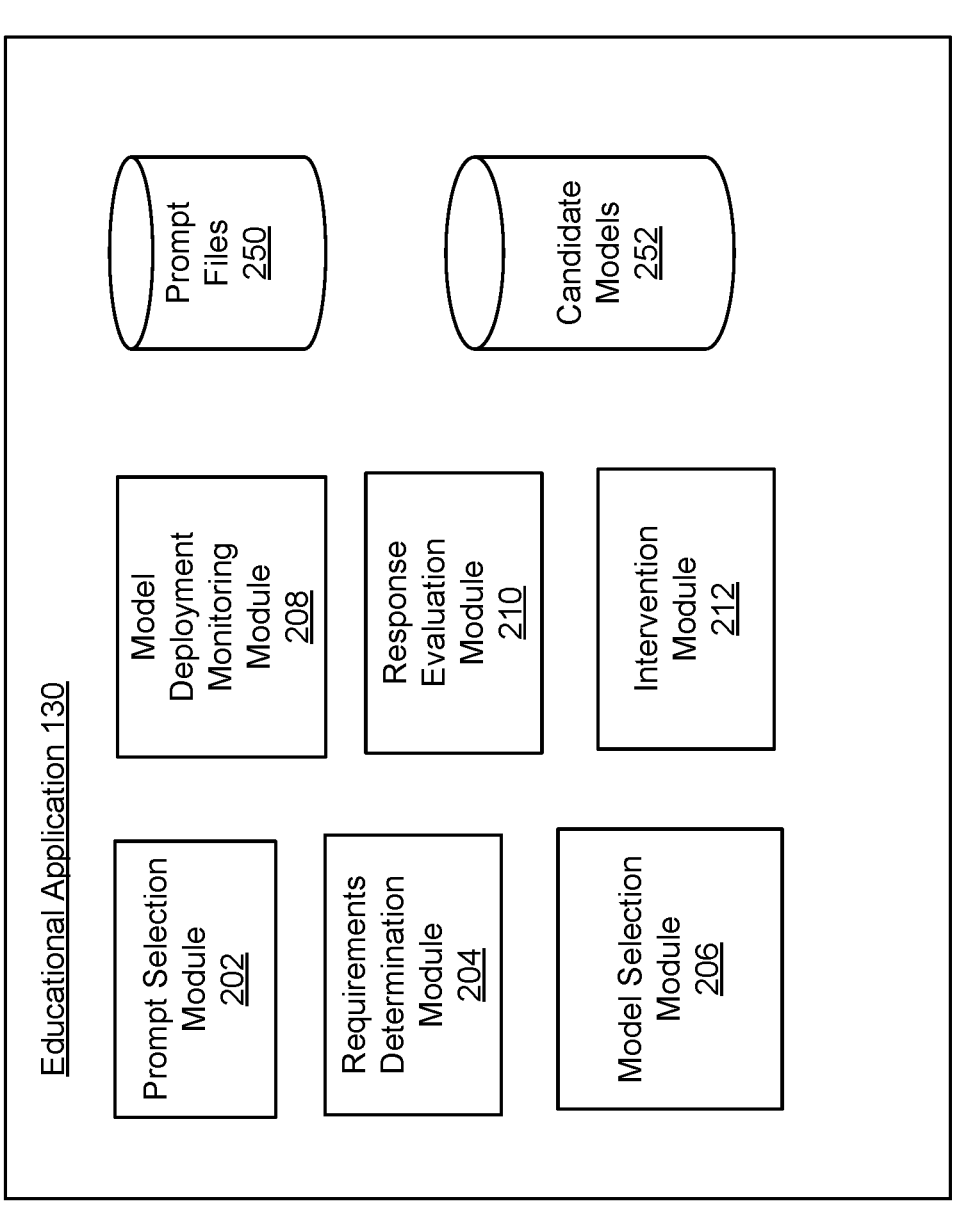
FIG. 2 illustrates one embodiment of exemplary modules and databases used by the educational application, in accordance with an embodiment.

FIG. 2 illustrates one embodiment of exemplary modules and databases used by the educational application, in accordance with an embodiment. As depicted in FIG. 2, educational application 103 may include prompt selection module 202, requirements determination module 204, model selection module 206, model deployment monitoring module 208, response evaluation module 210, and intervention module 212, as well as prompt files database 250 and candidate models database 252. The modules and databases depicted in FIG. 2 are merely exemplary; fewer or additional modules and/or databases may be used to achieve the functionality disclosed herein.

Prompt selection module 202 selects a prompt for display to a student user. Exemplary prompts may include educational information, an educational question, an intervention, an evaluation of a prior answer, and so on. Prompts, and workflow for what prompts are to be displayed, may be curated based on rules defined within educational application 130. For example, an educational author may have input a workflow into educational application 130 that has a sequence of information to be presented to a student user, questions to be asked to the student user, different follow-up prompts to be displayed depending on the accuracy and/or content of the student user's answer, and so on. Prompt selection module 202 may select a prompt based on this workflow, and educational application 130 may output the prompt for display to the student user on client device 110 (e.g., using application 111).

Educational application 130 receives a response to the prompt from the student user. Requirements determination module 204 determines requirements associated with processing the response. Requirements determination module 204 may determine the requirements heuristically, using a machine learning model, and/or a combination. In an embodiment, requirements may be determined based on a category of the prompt. For example, the prompt may be asking for a response to a multiple-choice question, where a response is chosen from a pre-populated and limited menu of candidate responses. This may be distinguished from an open-ended question, where the prompt is asking for a free-form response. To determine the category of the prompt, requirements determination module 204 may perform a pattern matching algorithm to determine a closest-matching template of candidate templates to the prompt, each template having a category. Requirements determination module 204 may determine the category based on a template of a matching category. Multiple templates may match, and therefore multiple categories may be associated with a prompt. This may, rather than solely being performed on the prompt, additionally or alternatively be performed on an answer, or a combination of the prompt and the answer.

In an embodiment, requirements determination module 204 may determine the requirements using an unsupervised machine learning model. To perform this, requirements determination module 204 may generate a vector of embeddings for the prompt and/or the response to the prompt and input that into the unsupervised machine learning model (e.g., clustering model, nearest neighbor search, etc.). The unsupervised machine learning model may output one or more clusters to which the input corresponds. Each candidate cluster may be tagged with one or more corresponding requirements, and therefore, requirements determination module 204 may determine the requirements based on the requirements tagged to the matching cluster.

Requirements determination module 204 may determine the requirements using a supervised machine learning model that is a requirements model. The requirements model may be trained using historical data showing input to one or more evaluation models as labeled with attributes of the output of the evaluation model. The attributes may include one or more of time to determine an output, whether determining an output was successful, one or more next actions of a student user in response to the output, and so on. The evaluation models may be models that directly process the student response and output an evaluation. Thus, when requirements determination module 204 inputs new input into the requirements model (e.g., the prompt, the student response, or a combination), the requirements model may output expected outcomes from each of a plurality of candidate evaluation models.

The term requirements, when used in connection with determining requirements for processing a student answer, may refer to any feature that impacts a decision on which of a plurality of candidate evaluation models is to be used to evaluate an answer. For example, where it is determined that a prompt has a discrete and limited set of candidate answers (e.g., a multiple choice or binary question), this indication may be a "requirement," in that a model capable of successfully outputting an answer to that type of question should be selected. Thus, categories (e.g., binary category, multiple choice category, freeform category, mathematical equation category, and any other category) may directly be considered requirements, or may map to requirements. As will be discussed with respect to model selection module 206, it may be that multiple models are capable of satisfying a requirement; however, by knowing the requirements, one requiring the least processing power or having the most efficiency or any other desired characteristic may be identifiable. Using a rules-based approach, an unsupervised approach, and a supervised approach separately may have individual advantages and disadvantages; accordingly, in some embodiments, requirements determination module 204 may use a combination of these approaches and may determine a set of requirements to include outputs from each of two or more of these embodiments.

Following generation of a predicted set of requirements for processing the response as performed by requirements determination module 204, model selection module 206 may select a model based on the predicted determining a predicted set of requirements for processing the response. In an embodiment, requirements (e.g., categories of prompt and/or answer) may be indexed, where the index maps those requirements to one or more models that may be used to process the response. For example, the index may map multiple choice questions to a heuristic model that evaluates whether the correct choice was corrected. The index may map freeform answers to one or more large language models available for use in evaluating the response.

Some large language models (LLMs) may pose tradeoffs in terms of processing capabilities. That is, some LLMs may be tuned to provide an answer quickly and may require relatively less processing power relative to other LLMs, but has a lower accuracy (e.g., where a complexity of question may result in a below-acceptable level of accuracy). Other LLMs may have a much higher accuracy, but have much higher latency and/or require substantially more computing power. All LLMs require substantially more processing power than a rules-based approach. Therefore, substantial processing efficiency can be achieved by selectively choosing models that optimize for providing an evaluation of a student answer with sufficient accuracy while using the least amount of processing power necessary to achieve that correct evaluation.

Following this logic, the index may map certain requirements to certain LLMs. As a concrete example, a free-form text may be mapped to GPT3.5, and where a mathematical formula having a certain characteristic, such as a derivative function, is used, this may be mapped to GPT4, where GPT3.5 is more efficient but less accurate than GPT4. In an embodiment, the index may map characteristics or sets of characteristics to only one model (e.g., the most processing-efficient model that is capable of handling all characteristics of a set). In another embodiment, the index may map characteristics or sets of characteristics to a plurality of models, each model capable of producing an evaluation with sufficient accuracy/confidence, where downstream processing may be performed by model selection module 206 to select from the plurality of models which one is the most efficient model for usage. Model selection module 206 may leverage this index to select a model. Model selection module 206 may select a model having a worst characteristic relative to other models indicated as sufficient to perform an evaluation (e.g., average processing latency, where a longer latency is acceptable and where the model is more efficient from a computational perspective).

In some embodiments, model selection module 206 may use a supervised machine learning model to determine which model to select. Model selection module 206 may train such a selection model by using training examples with example answers to be evaluated (or attributes thereof) as labeled by whether or not processing by each candidate model that had attempted to evaluate the answer was successful. Therefore, model selection module 206 may obtain a likelihood of success of each model by running example answers (or attributes thereof) through the selection model, and may select a given one of the candidate models based on likelihood of success (and possibly based on other factors, such as trade-offs in likelihood of success as evaluated against other processing criteria).

In an embodiment, model selection module 206 may select a model based on a default, where the model may be replaced by selection of another model based on output of the default model. For example, a default rule may exist where questions having binary or multiple choice answers will default to using a rules model to evaluate whether answers are correct, and all other questions (e.g., free form and math questions) will use GPT3.5. In other embodiments, model selection module 206 may select a model based on an index as described above. Regardless of how the model was initially selected, model deployment monitoring module 208 may monitor processing and/or output of the selected model and determine whether further action is to be taken based on the processing and/or output.

In an embodiment, model deployment monitoring module 208 may monitor processing to determine whether, while processing the response, a threshold amount of a processing criterion has been reached. The term processing criterion can encompass time consumption, power consumption, compute resources used, latency, or any other criterion. Multiple criteria may be monitored together by model deployment monitoring module 208. As an example, model deployment monitoring module 208 may determine that a selected model is hung for more than a threshold amount of time, has consumed more than threshold amount of compute, power, and/or energy, is experiencing more than a threshold amount of latency, and/or any combination thereof. Responsive to determining that the threshold amount of processing criterion has been reached, model deployment monitoring module 208 may replace the first model with a second model for processing the response. The second model may have a higher average expected processing criterion than the first model (e.g., the second model may be expected to require a higher amount of compute consumption than the first model, such as moving from GPT3.5 to GPT4, but with a higher likelihood of success given that complexity of the answer being processed may have been too much for the first model to handle). Model deployment monitoring module 208 may instruct processing by the first model following replacement using the second model.

In an embodiment, model deployment monitoring module 208 may monitor confidence scores output by the selected model, and may determine whether the confidence score is higher than a minimum threshold confidence. For example, GPT3.5 may successfully output an evaluation of an answer including a mathematical formula, but with only a 62% confidence where a threshold required confidence is 95%. Responsive to determining that the confidence score is lower than the minimum threshold confidence, model deployment monitoring module 208 may select a second model (e.g., GPT4) to evaluate the answer. When falling back to a second model, model deployment monitoring module 208 may instruct model selection module 206 to select a model having a higher computational requirement but having a higher degree of accuracy and higher likelihood of success.

After a model is selected, response evaluation module 210 applies, as input to the selected model, the response from the student user. Response evaluation module 210 may, where model deployment monitoring module 208 determines that a different model is needed to replace a selected model, apply the response to that different model as well. Response evaluation module 210 may additionally provide the selected model with instructions for determining an evaluation for the response. For example, the instructions may be for a LLM to assume the role of a teacher with certain knowledge about a certain curriculum when determining how to evaluate the response, and to provide a rubric for establishing whether a response is correct or incorrect or requires some other handling.

Response evaluation module 210 selects a next prompt to be displayed to the student user by the user interface based on the determined evaluation. The next prompt may be determined based on pre-established rules for how to proceed depending on the evaluation. For example, where an evaluation is that a response from a student user is correct or incorrect, then a rule may exist to traverse to a next prompt within an educational workflow (e.g., proceed to prompting the next question for a quiz where the answer is correct, or proceeding to an explanation or diverting to a remedial workflow or lecture where the answer is incorrect).

Response evaluation module 210 may detect that an intervention is required based on the evaluation. For example, response evaluation module 210 may have indicated to the LLM instructions to determine that an intervention is needed where a student's response indicates violence, self-harm, inappropriate language, or other damaging or disparaging remarks. Response evaluation module 210 may therefore output that an intervention is required, and this may be provided with or without an indication that a student's response is correct. The evaluation may indicate an explanation of why an intervention is required. For example, the LLM may output a classification of the response (e.g., violent, self-harm, vulgar), and based on the classification educational application 130 may determine a type of intervention.

Intervention module 212 causes the next prompt selection to be an intervention. The intervention may include a prompt that is selected based on the evaluation. For example, if the evaluation indicates that a vulgar word was used, the prompt may explain that vulgar words are inappropriate, and following the prompt (and perhaps an additional input from the user indicating that they understand and apologize), and next prompt may be from a resumption of the educational workflow. The prompt selected may depend on prior interventions, where the message sent to the student user may escalate in seriousness, until a threshold amount of interventions are made, after which intervention module 212 may determine to suspend or ban the student user from using educational application 130 (e.g., until an educator grants a resumption of access).

Beyond just a prompt, intervention module 212 may additionally include other components in an intervention, such as transmission of the student's response to an educator or an administrator or parent, or such as a notification to an educator or administrator or parent or other chaperone that alerts them to the issue.

Prompt files database 250 may store files that may be used to prompt a student user. Prompt files database 250 may also include instructions and/or context to be provided to a LLM in connection with evaluating a student answer. Candidate models database 252 may store the candidate models from which model selection module 206 selects a model.

In an embodiment, educational application 130 is embedded within a secondary educational application corresponding to a curriculum. That is, the secondary educational application may be a website hosting learning from a particular textbook or other learning source. Educational application 130 may be embedded on this website, and may support learning from the secondary educational application's learning source(s) by applying the educational workflow, prompts, and interventions of educational application 130. This may be achieved by priming the selected model with context using the curriculum of the secondary educational application.

FIG. 3 shows one embodiment of an exemplary code file for prompting a student user, in accordance with an embodiment. Code file 300 depicts a partial set of code (e.g., in a YAML file) used by educational application 130 to select prompts, models, and/or instruct an LLM. Sections 1-3 include metadata, such as a version number of a specification and an activity, and section 3 includes a title relating to the activity that may be displayed to a user (e.g., Course on War of 1882).

Section 4 may identify a maximum number of attempts for a given step in an educational workflow. That is, where educational application 130 detects that a wrong answer has been given for a given question the threshold number of steps, educational application 130 will move on to another activity (e.g., skip to a next step or move to remedial programming). Section 5 lists the different sections in an activity, such as the different components of today's lesson on the War of 1882. Section 6 indicates a title for a section, and section 7 indicates a label for a section to facilitate jumping to the section (e.g., "remedial section on historical figures" or "section 3 of 8")

Section 8 indicates a background for an LLM, and may include instructions that prime the LLM on how to evaluate a student answer (e.g., as elaborated on in section 9). Section 10 lists all of the steps required to complete a section of an activity, and establishes the educational workflow for that section. Sections 11 and 12 label steps and content blocks.

FIG. 4 shows one embodiment of an exemplary code file for processing answers received from a student user, in accordance with an embodiment. Code file 400 is a zoomed in version of some portions of code file 300, showing some additional detail. As shown in code file 400, classification information may include metadata used to classify a student's answer to a question, which may be fed to a LLM as context for outputting an evaluation. Exemplary classification "buckets" are shown, which show classification types, as well as examples of passing and/or failing text that may be used to train the LLM to accurately evaluate an answer.

Figure 5:
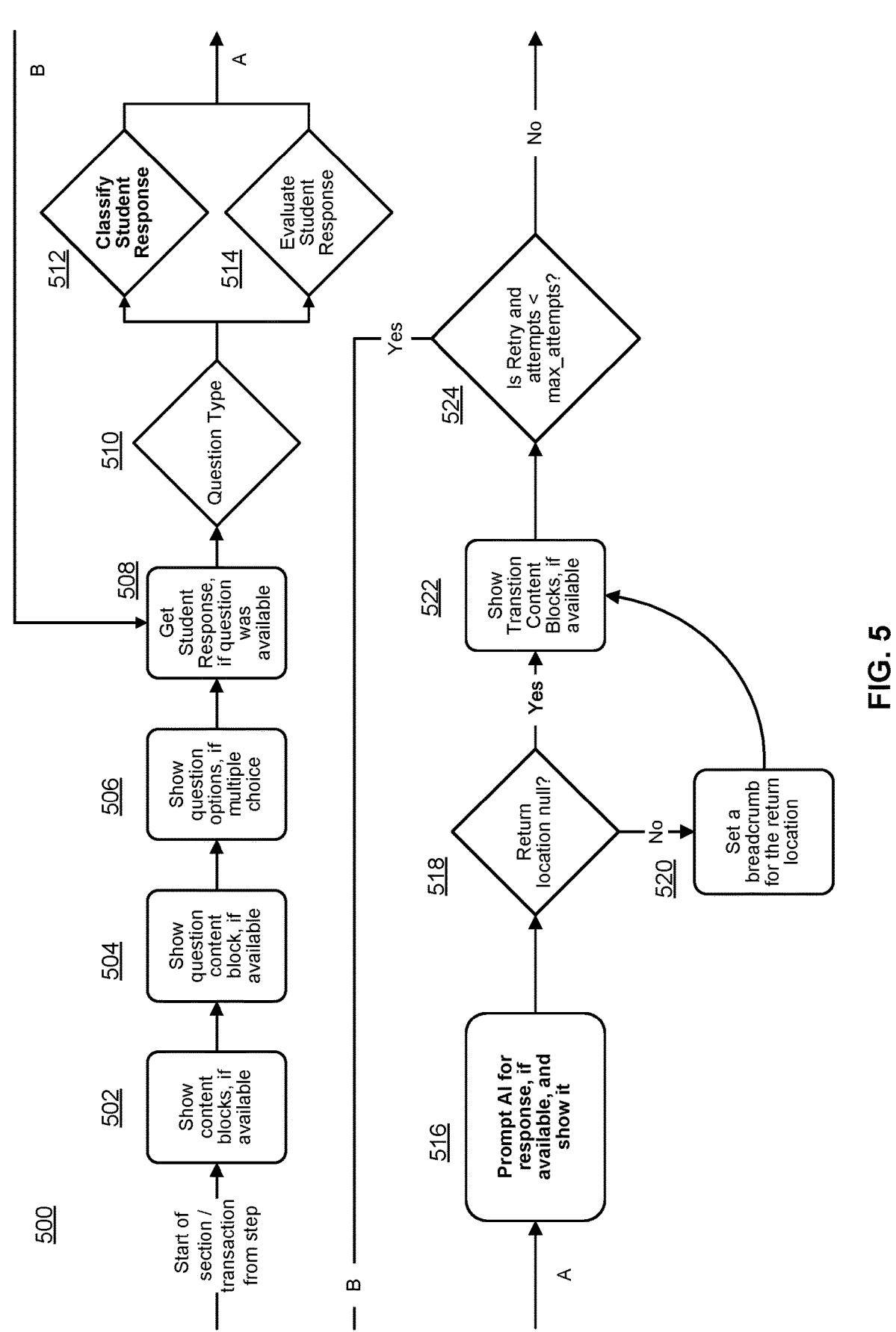
FIG. 5 illustrates an exemplary end-to-end process for prompting and processing responses by an educational application, in accordance with an embodiment.

FIG. 5 illustrates an exemplary end-to-end process for prompting and processing responses by an educational application, in accordance with an embodiment. Process 500 begins at the beginning of a next step in an educational workflow, such as an educational module on a particular component of an educational section. Educational application 130 shows 502 one or more content blocks if they are available, and this may include explanations or lesson information to teach a student user a concept. Educational application 130 then shows 504 a question to the student user, if a question is part of the educational workflow. If the question is multiple choice, binary, or otherwise has a discrete set of candidate answers, educational application 130 also shows 506 those candidate answers.

Educational application 130 obtains 508 a student response, and determines 510 whether the question type is of the sort that is to be classified (e.g., where there are a discrete set of candidate answers) or whether they are to be evaluated without a classification (e.g., where natural language is to be analyzed and evaluated according to instructions). Educational application 130 then either classifies 512 or otherwise generates instructions for evaluating 514 the student response, and where the response is to be evaluated, prompts 516 artificial intelligence (e.g., a LLM) for an evaluation. The evaluation may be shown to the student user.

Educational application 130 may determine 518 whether to return to a location (e.g., a remedial content) and if so to set 520 a breadcrumb to return to the question after the workflow associated with the return is complete. Educational application 130 may show 522 transition content blocks where available (e.g., where the answer is correct, a transition to a next component, an indication that a question needs to be repeated, or a congratulations screen indicating that the course content for the section is complete). Educational application 130 may, where the student answer is incorrect, loop back to obtaining a student response where the student has not yet attempted the maximum allowed number of retries, and otherwise may continue on to a next piece of content in the educational workflow.

Figure 6:
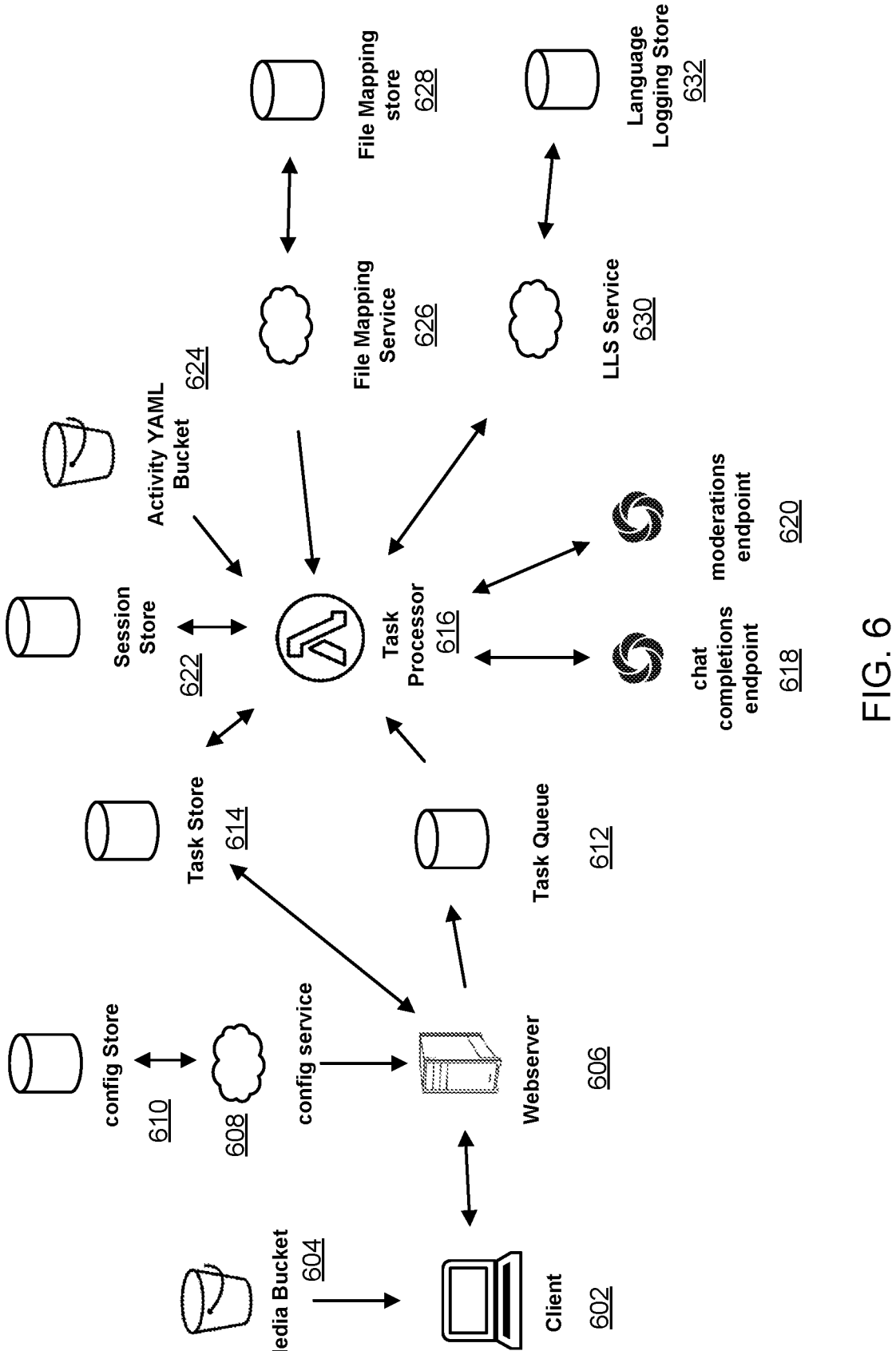
FIG. 6 illustrates an exemplary depiction of discrete system components, in accordance with an embodiment.

FIG. 6 illustrates an exemplary depiction of discrete system components, in accordance with an embodiment. Environment 600 shows a zoomed in view of environment 100 with an exemplary and non-limiting configuration of components used by educational application 130. Client 602 may be an equivalent to client device 110, and may receive media (e.g., video, audio, text, and so on) from media bucket 604 based on instructions from educational application 130 as to what to show to the student user operating the client.

Webserver 606 is a webserver that receives requests from application 111 of client 602 to pass them downstream, and returns information to client 602. An exemplary implementation may include a Flask webserver, which is an open source Python webserver, though any other form of webserver may be used. Webserver 606 also connects to config server 608, which may be responsible for configuring application 130's activities based on configurations selected from config store 610.

Responsive to receiving a request from a client (e.g., an input of a student response to a prompt), webserver 606 dispatches a corresponding task for processing the request (e.g., along with corresponding config information where necessary) to task queue 612. Task queue 612 queues work to be done in the background, and holds a queue or list of pending jobs (e.g., pending student responses to be processed). Tasks are performed asynchronously, without a need for client 602 to wait or otherwise be on hold for a response. This is because LLMs may take a long amount of time to process an inquiry, and client 602 may be able to perform other tasks in the meanwhile, thus resulting in improved efficiency in releasing client 602 to perform other tasks (e.g., presenting other media while the answer is being evaluated).

Client 602 and/or webserver 606 (without being prodded by client 602) may periodically, a-periodically, or otherwise based on a trigger ping the task queue 612 requesting an update on whether a given task is complete. When the task is complete, webserver 606 may responsively provide a communication to client 602 that the task is complete, along with information on where to obtain a result (that is, the evaluation from the LLM). Client 602 then responsively obtains the result. Results may be stored in task store 614, and client 602 may retrieve the results from task store 614 based on an identifier that indexes the task within the task store 614. Task results may be stored in task store 614, or may be deleted responsive to retrieval of the task result or some other condition (e.g., a predefined amount of time has elapsed).

Task processor 616 manages activities of educational application 130 involved in evaluating a student answer, such as providing context to an LLM, providing classification definitions, and so on. Information associated with code files 300 and 400 may be processed for inclusion in context provided to an LLM. Task processor 616 may be instantiated on a cloud service provider, such as being a Lambda instantiation on Amazon Web Services, where task queue 612 is an SQS task queue, though any other implementation on any other cloud service provider may be used. A different, new instantiation of task processor 616 may be generated each time a new task is processed, and may be torn down each time a new task is complete.

As an example, code files 300 and 400 may be part of a YAML file, which acts as a skeleton for the activity that is running. Like a recipe, this YAML file may be a structured setup for the individual activity. Where used herein, YAML may be generalized to other files having properties that enable achieving the tasks described with respect to YAML but have other formats, for example JSON or XML formats or any other structured data format. Task processor 616 determines, using the YAML file, what is the current step that we're on with this activity, and given the student response and the contents of the YAML file determines what to send to the LLM and builds prompts accordingly. To build the prompt, task processor 616 may retrieve metadata from file mapping service 626, which stores metadata in file mapping store 628 relating to what class a given answer is for, what course the student is enrolled in, and so on. Because task processor 616 is instantiated anew for processing each given task in some embodiments, it must initiate itself each time with metadata for processing a given student answer, and therefore is quickly able to do so using file mapping service 626 and file mapping store 628.

Following task processor 616 initiating itself with metadata relating to the activity to which the student response corresponds, task processor 616 must determine where the student is within the workflow of the activity. As part of what is stored with the task in task queue 612 is a session identifier, which may be used to retrieve session information from session store 622 to populate where in the session the student currently is. Storing session information using session store 622 and session identifiers enables new instantiations of task processor 616 to pick up from the immediately prior instantiation right where the session last left off.

The reason why task processor 616 re-instantiates for each task is due to a nuance of how cloud service provider architectures, such as the Amazon Web Server's (AWS) Lambda architecture, operate-namely, that they are stateless processing systems. For example, because it is a stateless processing system, every time the system invokes a Lambda, the system must assume that from a perspective of AWS that it is spinning up a wholly new environment with no memory from one invocation of Lambda to the next. Systems like Lambda are a good solution, despite needing to be re-instantiated each time, because educational application 130 is generally used for only a portion of the day, such as school hours between 9:00 am and 3:30 pm. Having an ability to tear down resources outside of those hours and outside of school days prevents a need to provision servers during those times, which saves massively on computational power and latency that would otherwise be wasted. Moreover, scalability based on demand is achieved, where if there are many classes running simultaneously, many task processors can be rapidly scaled up and down to accommodate the demand.

Chat completions endpoint 618 is a LLM that processes and evaluates student answers; however, moderations endpoint 620 may be used to detect content that requires an intervention. Moderations endpoint 620 may indicate whether and why content is or is not flagged, and how much confidence it has in flags. LLS (Language Logging Store) Service 630 and Language Logging Store 632 log instances where interventions occur, including student answers that include inappropriate content. LLS 630 may receive all of the prompts that were sent to the LLM and it also receives all of the replies that the LLM sent back. LLS 630 may also receive all of the moderation replies and store them to Language Logging Store 632, which may be an Open Search database enabling one to go back to the actual prompt that was sent by task processor 616 to the LLM or the actual reply we got from the LLM endpoints. In effect, LLS Service 630 facilitates building of a warehouse of every single interaction that happens with the LLM for later diagnosis. Activity YAML bucket 624 may store YAML files, such as code files 300 and 400.

FIG. 7 illustrates an exemplary flowchart showing a process for implementing an educational application, in accordance with an embodiment. Process 700 may be implemented by having one or more processors execute instructions that cause the modules of FIG. 2 to perform the operations that form part of the process. Process 700 begins with educational application 130 generating 710 for display a prompt to a student user (e.g., using prompt selection module 202). Educational application 130 receives 720, from the student user, a response to the prompt, and determines 730 a predicted set of requirements for processing the response (e.g., using requirements determination module 204). Educational application 130 selects 740, from a plurality of candidate models having different processing capabilities, a model for processing the response based on the predicted set of requirements (e.g., using model selection module 20 to select from candidate models database 252).

Educational application 130 applies 750 the response as input to the selected model, where the selected model is provided instructions for determining an evaluation for the response (e.g., using a code file such as code file 300 and/or code file 400). Educational application 130 selects 760 a next prompt to be displayed to the student user based on the determined evaluation (e.g., using a combination of response evaluation module 210 and prompt selection module 202). Educational application 130 generates 770 for display the next prompt (e.g., a next step in the educational workflow).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   generating for display, by an educational application having a user interface, a prompt to a student user;
   receiving, from the student user, by the educational application, a response to the prompt;
   determining a predicted set of requirements for processing the response, each candidate requirement being based on a category of one or more of the prompt and the response, each requirement associated with a required processing capability by a large language model;
   determining, from a plurality of candidate models having different processing capabilities, a subset of the plurality of candidate models that satisfy the predicted set of requirements;
   selecting, by the educational application, from the subset, a large language model for processing the response, the selected model selected based on it requiring less processing power to process the response relative to other models of the subset of the plurality of candidate models capable of processing the response based on the predicted set of requirements;
   applying, as input to the selected model, the response, wherein the selected model is provided instructions for determining an evaluation for the response;
   selecting a next prompt to be displayed to the student user by the user interface based on the determined evaluation; and
   generating for display, by the educational application, the next prompt.

2. The method of claim 1, wherein selecting, by the educational application, from the plurality of candidate models having different processing capabilities, the model for processing the response comprises:
   selecting a first model for processing the response;
   determining that, while processing the response, a threshold amount of a processing criterion has been reached; and
   responsive to determining that the threshold amount of processing criterion has been reached, replacing the first model with a second model for processing the response, the second model having a higher average processing criterion than the first model.

3. The method of claim 2, further comprising, further responsive to determining that the threshold amount of processing criterion has been reached, canceling the processing of the response by the first model.

4. The method of claim 1, wherein selecting, by the educational application, from the plurality of candidate models having different processing capabilities, the model for processing the response comprises:
   categorizing content within the response into one or more content categories; and determining, based on an index that maps content categories to models, one or more models suitable for processing the response.

5. The method of claim 4, further comprising selecting a model from the one or more models suitable for processing the response having a highest average processing latency relative to the other models of the one or more models suitable for processing the response.

6. The method of claim 1, wherein each model of the plurality of candidate models is a large language model (LLM).

7. The method of claim 1, wherein the selected model has a highest average processing latency relative to the other models of the plurality of candidate models suitable for processing the response.

8. The method of claim 1, wherein the educational application is embedded within a secondary educational application corresponding to a curriculum, and wherein the selected model is primed with context using the curriculum.

9. A non-transitory computer-readable medium comprising memory with instructions encoded thereon, the instructions, when executed by one or more processors, causing the one or more processors to perform operations, the instructions comprising instructions to:

generate for display, by an educational application having a user interface, a prompt to a student user;

receive, from the student user, by the educational application, a response to the prompt;

determine a predicted set of requirements for processing the response, each candidate requirement being based on a category of one or more of the prompt and the response, each requirement associated with a required processing capability by a large language model;

determine, from a plurality of candidate models having different processing capabilities, a subset of the plurality of candidate models that satisfy the predicted set of requirements;

select, by the educational application, from the subset, a large language model for processing the response, the selected model selected based on it requiring less processing power to process the response relative to other models of the subset of the plurality of candidate models capable of processing the response based on the predicted set of requirements;

apply, as input to the selected model, the response, wherein the selected model is provided instructions for determining an evaluation for the response;

select a next prompt to be displayed to the student user by the user interface based on the determined evaluation; and generate for display, by the educational application, the next prompt.

10. The non-transitory computer-readable medium of claim 9, wherein the instructions to select, by the educational application, from the plurality of candidate models having different processing capabilities, the model for processing the response comprise instructions to:

select a first model for processing the response;

determine that, while processing the response, a threshold amount of a processing criterion has been reached; and responsive to determining that the threshold amount of processing criterion has been reached, replace the first model with a second model for processing the response, the second model having a higher average processing criterion than the first model.

11. The non-transitory computer-readable medium of claim 10, the instructions further comprising instructions to, further responsive to determining that the threshold amount of processing criterion has been reached, cancel the processing of the response by the first model.

12. The non-transitory computer-readable medium of claim 9, wherein the instructions to select, by the educational application, from the plurality of candidate models having different processing capabilities, the model for processing the response comprise instructions to:

categorize content within the response into one or more content categories; and determine, based on an index that maps content categories to models, one or more models suitable for processing the response.

13. The non-transitory computer-readable medium of claim 12, the instructions further comprising instructions to select a model from the one or more models suitable for processing the response having a highest average processing latency relative to the other models of the one or more models suitable for processing the response.

14. The non-transitory computer-readable medium of claim 9, wherein each model of the plurality of candidate models is a large language model (LLM).

15. The non-transitory computer-readable medium of claim 9, wherein the selected model has a highest average processing latency relative to the other models of the plurality of candidate models suitable for processing the response.

16. The non-transitory computer-readable medium of claim 9, wherein the educational application is embedded within a secondary educational application corresponding to a curriculum, and wherein the selected model is primed with context using the curriculum.

17. A system comprising:

memory with instructions encoded thereon; and one or more processors that, when executing the instructions, are caused to perform operations comprising:

generating for display, by an educational application having a user interface, a prompt to a student user;

receiving, from the student user, by the educational application, a response to the prompt;

determining a predicted set of requirements for processing the response, each candidate requirement being based on a category of one or more of the prompt and the response, each requirement associated with a required processing capability by a large language model;

determining, from a plurality of candidate models having different processing capabilities, a subset of the plurality of candidate models that satisfy the predicted set of requirements;

selecting, by the educational application, from the subset, a large language model for processing the response, the selected model selected based on it requiring less processing power to process the response relative to other models of the subset of the plurality of candidate models capable of processing the response based on the predicted set of requirements;

applying, as input to the selected model, the response, wherein the selected model is provided instructions for determining an evaluation for the response;

selecting a next prompt to be displayed to the student user by the user interface based on the determined evaluation; and generating for display, by the educational application, the next prompt.

18. The system of claim 17, wherein selecting, by the educational application, from the plurality of candidate models having different processing capabilities, the model for processing the response comprises:

selecting a first model for processing the response;

determining that, while processing the response, a threshold amount of a processing criterion has been reached; and responsive to determining that the threshold amount of processing criterion has been reached, replacing the first model with a second model for processing the response, the second model having a higher average processing criterion than the first model.

19. The system of claim 18, further comprising, further responsive to determining that the threshold amount of processing criterion has been reached, canceling the processing of the response by the first model.

20. The system of claim 17, wherein selecting, by the educational application, from the plurality of candidate models having different processing capabilities, the model for processing the response comprises:

categorizing content within the response into one or more content categories; and determining, based on an index that maps content categories to models, one or more models suitable for processing the response.

* * * * *